Patented Nov. 30, 1937

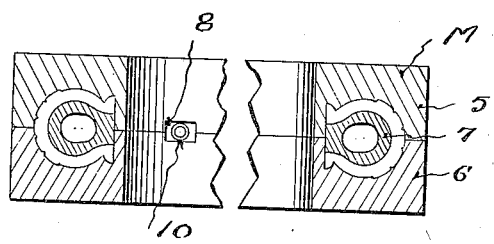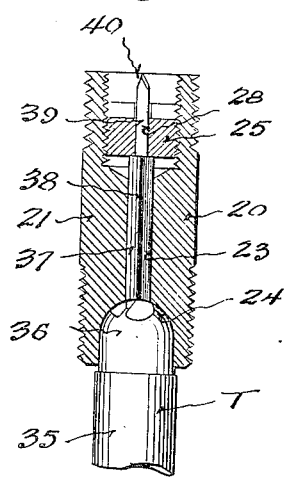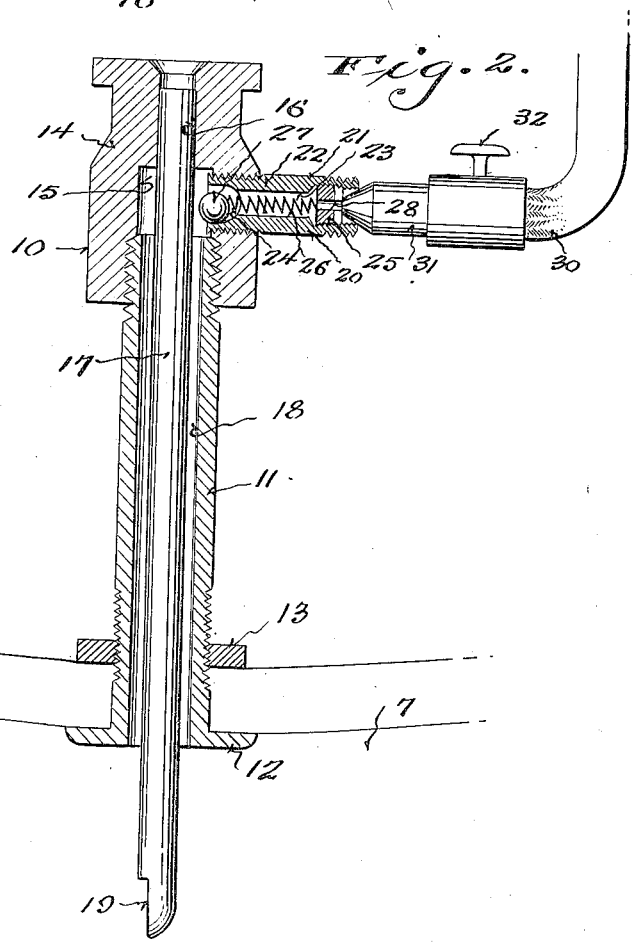

2,100,627

UNITED STATES PATENT OFFICE 2,100,627

TIRE VULCANIZING CORE

Floyd L. Bucy and Vela A. La Rock, Eau Claire, Wis.

Application March 4, 1935, Serial No. 9,234

2 Claims. (Cl. 18—45)

This invention appertains to devices of the character shown in our pending application Serial No. 746,392, filed October 1, 1934, for Curing tires and other rubber articles.

Briefly, the said application discloses means for introducing under pressure steam, water, or air in the curing bag, in such a manner as to drive out the dead air in said bag in advance of the pressure, through a normally open check valve, and to utilize said valve at a predetermined time to admit heat or pressure into the curing bag from the heater casing for the moulds.

In actual practice, considerable difficulty has been experienced with the check valves, in that the valves tend to stick from corrosion, due to the heat, and the port and the valve seat soon clog up from the scale from the curing bag, preventing the proper opening and closing of the valve.

Our present invention, therefore, appertains to a novel method and means for checking the operation of the relief valves, and for cleaning the same, whereby the proper operation of the valves, and the consequent proper operation of the entire system, are assured.

Another important object of our invention is to provide an improved form of relief valve, which embodies a minimum number of parts, and which will be exceptionally efficient in use, and one which can be readily cleaned.

A further important object of our invention is the provision of a novel tool for cleaning the valve casing, the tool being so designed as to efficiently clean and ream the port and passageways, and to simultaneously re-face and clean the valve seat.

With these and other objects in view, the invention consists in the novel construction, arrangement, and formation of parts, as will be hereinafter more specifically described, claimed, and illustrated in the accompanying drawing, in which drawing:—

Figure 1 is a diametric section through a mould equipped with our improved device.

Figure 2 is an enlarged longitudinal section through the improved device for admitting pressure into the curing bag, a fragment of the bag being shown in section, the figure also illustrating the means for applying pressure to the relief valve for cleaning and checking the same.

Figure 3 is a detail sectional view through the relief valve casing with the valve and spring removed therefrom, and the cleaning tool inserted therein.

Referring to the drawing in detail, wherein similar reference characters designate corresponding parts throughout the several views, the letter M generally indicates a tire mould, which can be of the usual or conventional type. As illustrated, the mould M includes a pair of like companion circular mould sections 5 and 6, between which is received the annular curing bag 7. The tire to be cured is received between the mould sections 5 and 6, and the bag 7 is arranged interiorly of the tire to hold the tire in correct form and expanded against the inner face of the mould. The mould sections 5 and 6 at one point can be provided with mating notches 8 for receiving the pressure device 10.

The pressure device 10 comprises an elongated tubular casing or sleeve 11, which enters into and is secured to the curing bag 7. The inner end of the casing or sleeve 11 is provided with an attaching plate 12 for engaging against the inner face of the curing bag. This plate 12 is held in fluid-tight connection with said face by the use of a nut, or the like, 13, threaded on the casing 11 into intimate binding contact with the outer face of the curing bag. The casing or sleeve 11 is adapted to extend exteriorly of the mould sections 5 and 6, through the notches 8, and the extreme outer end of the casing or sleeve has connected therewith in any desired manner the pressure head 14. The pressure head 14 is provided with a bore 15, in which the casing or sleeve 11 is secured, and the outer end of the bore is reduced, as at 16.

The reduced portion 16 of the bore 15 has secured therein the inlet pressure tube 17, and this tube extends through the sleeve or casing 11 into the curing bag. The inlet pressure tube 17 is of a smaller diameter than the interior diameter of the casing or sleeve 11, and consequently a chamber 18 is provided between the casing or sleeve 11, and the head 14 and tube 17. The inner end of the tube 17 is provided with an outlet opening 19, which faces away from the side walls of the curing bag to drive the air in the bag around the bag in advance of the pressure when the steam is admitted through the tube.

During the curing of the tire, or other rubber article, a coupling head (not shown) is connected with the pressure head 14, so as to permit flow of heat and pressure into the curing bag.

The pressure head 14 carries our novel relief check valve 20. This relief check valve 20 includes a valve casing 21, suitably connected to the pressure head. As shown, the pressure head 14 is provided with a radially extending, internally threaded bore 22 for receiving the inner threaded end of the valve casing. The outer end of the valve casing can also be provided with external threads, if so desired, for the reception of a cap, or the like.

A longitudinally extending bore or passageway 23 is formed in the valve casing 21, and the inner end of the bore is enlarged to provide a valve seat 24. The outer end of the bore is provided with internal screw threads for the reception of an externally threaded disc or lock nut 25, against which normally bears the expansion coil spring 26.

A ball valve 27 is employed for the valve seat, and the spring 26 normally holds the valve off of said seat. The threaded disc 25 is provided with axial bore or opening 28 to permit the passage of fluid therethrough.

In actual practice, the spring is of a predetermined tension so that the valve 27 will be moved and held on its seat when a predetermined pressure is reached. The operation of a similar type of valve is thoroughly described in our previous application heretofore mentioned.

When pressure is admitted to the curing bag 7 through the tube 17, the fluid flows into the bag through the opening 19, and the dead air in the bag is driven around the same in advance of the pressure, and flows into the chamber 18, past the valve 27, and out of the valve casing 21. When the pressure reaches the valve 27, the same is moved on its seat.

The use of relief check valves has always been open to question, in view of the likelihood of the same not operating properly. Scales from the interior of the bag frequently get between the valve seat and the valve, causing the valve to remain open, and again the valve may seat so tight that air cannot escape when pressure is forced into the bag. Likewise, corrosion from the heat also keeps the valve from operating accurately. All of these objections to air relief valves are well known.

Our present valve 20 is so designed as to operate efficiently, and embodies a minimum number of operating parts which are not liable to stick, and the valve can be readily and easily cleaned when necessary.

We have devised a novel method of checking the operation of the relief valves, and for cleaning the valve when the same becomes corroded, or choked with scale. If desired, pressure can be utilized for cleaning the valve 20, and an innocuous cleaning compound can be used. Thus, as shown in Figure 2, a pressure hose 30 can be connected with the outer end of the valve casing 21, through the medium of a head or chuck 31. A thumb-button controlled valve 32 can be utilized for regulating the flow of pressure from the hose into the valve casing. When the valve is being cleaned, the pressure can flow into the chamber 18, into the curing bag 7, thence into the tube 17, and out of the tube into the atmosphere. The liquid flowing in through the casing 21 from the hose 30 forces the ball or valve 27 between the tube 17 and its seat 24, and tends to rotate the ball in different directions, which cleans the valve or ball. The pressure also cleans the chamber 15 of scale, and thus has a beneficial effect on the entire device.

The hose 30 can also be used for checking the operation of the valve 27, as will now be described. After the tire is cured and removed from the mould, the curing bag 7 is taken out from the cured tire, and the outer surface of the bag is inspected for any defects. The bag is then dipped in a solution to lubricate the outer face thereof, so that the bag can be easily removed from the tire when it is used again. The bag is now placed on a suitable conveyor chain, or the like, in a vertical position, with the pressure head 14 near the top. The air hose 30 is applied to the check valve 20, and the valve is carefully tested for its accuracy in opening and closing.

If the valve fails to open at the desired pressure, the entire valve 20 is removed from the head. This permits easy removal of the valve 27 and its spring 26. The valve casing, the valve seat, and so forth, are now cleaned by a special tool, which forms an important part of our present invention. This tool is generally indicated by the reference character T, and includes a tang 35, which can be fitted in a suitable drill chuck to permit the rapid rotation thereof. Formed on the forward end of the tang 35 is a reamer head or cutter 36, which is shaped to fit the valve seat 24, so that when the tool is rotated the valve seat will be cleaned and re-ground.

Extending axially from the reamer or cutter head 36 is an elongated stem 37. This stem is of a polygonal shape in cross section, and is provided with longitudinally extending cutting edges 38. This stem is received within the passage 23, and effectively cleans the walls of the passage. Formed axially on the forward end of the stem 38 is a shank 39 of substantially cylindrical form, and the forward end of the shank is provided with a drill or cutter head 40. This permits the insertion of the tool through the bore 28 of the lock nut 25, and the same effectively cleans the walls of the bore. The tool is so constructed that the same will simultaneously clean the valve 20 in one operation, and with the expenditure of only a few seconds of time. After the casing 20 has been cleaned, the spring and valve 27 are again assembled, and the casing 21 is threaded into the head 14.

The importance of checking the operation of the valve 27 cannot be underestimated, as many tires are completely ruined by the failure of this valve, and we have found that our method of testing and cleaning the valve renders the entire curing process practical in actual use.

Changes in details may be made without departing from the spirit or the scope of our invention, but what we claim as new is:—

1. A tire-vulcanizing core comprising a distensible bag, an air outlet conduit mounted in and sealed to a wall of the bag, a valve in said conduit opening toward the interior of the bag, yielding means urging the valve toward its open position and adapted to be overcome only by differential pressure of fluid passing through the valve, and a conduit for conducting a distending fluid into the bag, the two conduits being in a single core-stem.

2. A tire-vulcanizing core comprising a distensible bag, an air outlet conduit mounted in and sealed to a wall of the bag, a valve in said conduit opening toward the interior of the bag, yielding means urging the valve toward its open position and adapted to be overcome only by differential pressure of fluid passing through the valve, and a conduit for conducting a distending fluid into the bag, the two conduits being in a single core-stem and the conduit for conducting the distending fluid into the bag being shaped to jet the said fluid longitudinally of the space within the bag.

FLOYD L. BUCY.
VELA A. LA ROCK.